United States Patent
Shanmugam

(10) Patent No.: US 12,471,118 B2
(45) Date of Patent: Nov. 11, 2025

(54) METHOD OF COMMUNICATING WITH A PLURALITY OF USER EQUIPMENT

(71) Applicant: Ashokkumar Shanmugam, Karlsruhe (DE)

(72) Inventor: Ashokkumar Shanmugam, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 18/208,267

(22) Filed: Jun. 10, 2023

(65) Prior Publication Data

US 2023/0403726 A1 Dec. 14, 2023

(30) Foreign Application Priority Data

Jun. 10, 2022 (EP) .................................. 22178425

(51) Int. Cl.
*H04W 72/30* (2023.01)
*H04W 72/121* (2023.01)
*H04W 84/12* (2009.01)

(52) U.S. Cl.
CPC ......... *H04W 72/30* (2023.01); *H04W 72/121* (2013.01); *H04W 84/12* (2013.01)

(58) Field of Classification Search
CPC .... H04W 72/30; H04W 72/121; H04W 72/12
See application file for complete search history.

(56) References Cited

U.S. PATENT DOCUMENTS

| | | | |
|---|---|---|---|
| 2015/0040232 A1* | 2/2015 | Oliphant | H04L 63/0281 726/25 |
| 2015/0146654 A1* | 5/2015 | Chu | H04L 1/1887 370/329 |
| 2016/0204912 A1* | 7/2016 | Sun | H04L 27/12 375/302 |
| 2018/0324638 A1* | 11/2018 | Chu | H04W 28/04 |
| 2022/0416961 A1* | 12/2022 | Frenne | H04L 5/0026 |
| 2023/0095005 A1* | 3/2023 | Han | H04L 5/0094 370/329 |

FOREIGN PATENT DOCUMENTS

EP        3599727 A2    1/2020

* cited by examiner

*Primary Examiner* — Ajay Cattungal
(74) *Attorney, Agent, or Firm* — Lempia Summerfield Katz LLC

(57) ABSTRACT

A method of communicating with a plurality of user equipment is provided. The method includes creating two or more client groups by grouping the plurality of user equipment, transmitting a trigger frame to the client groups, and receiving a response from a first user equipment from a first client group based on the trigger frame. Each client group from the two or more client groups includes one or more user equipment from the plurality of user equipment and a group identifier. The trigger frame includes client group information and a resource unit allocation information indicative of an allocation of resource units within the two or more client groups. The client group information includes one or more associations of one or more user equipment to a client group from the two or more client groups and a group transmission offset associated with the two or more client groups.

10 Claims, 3 Drawing Sheets

FIG 3

Table 310:

| Sl. no | Resource Unit | Device order in the group |
|---|---|---|
| 1 | Resource unit 1 | Device 1 |
| 2 | Resource unit 2 | Device 2 |
| 3 | Resource unit 3 | Device 3 |
| 4 | Resource unit 4 | Device 4 |

Table 300:

| Group Identifier | Device Identifier of devices of Group 1 | Device order in Group 1 |
|---|---|---|
| 101 | Mac ID:00:00:5E:00:53:ab | Device 1 |
| 101 | Mac ID:00:10:2A:00:51:ac | Device 2 |
| 101 | Mac ID:00:14:3D:00:34:ae | Device 3 |
| 101 | Mac ID:00:13:3F:00:34:af | Device 4 |

METHOD OF COMMUNICATING WITH A PLURALITY OF USER EQUIPMENT

This application claims the benefit of European Patent Application No. EP 22178425.9, filed on Jun. 10, 2022, which is hereby incorporated by reference in its entirety.

BACKGROUND

The current disclosure relates to wireless devices and more particularly, communication protocols used by wireless devices in industrial environments. With the adoption of Wi-Fi 6 and other wireless technologies in industrial automation, many industrial devices utilize wireless technologies for communication amongst themselves. Often in such technologies and protocols, trigger frames are used by access points and gateway device to coordinate with user equipment for requesting information, scheduling communication, etc.

SUMMARY AND DESCRIPTION

The current disclosure relates to wireless devices in industrial environments. Such wireless devices may use a plurality of wireless protocols such as Wi-Fi 6, etc. Wi-Fi 6 (802.11 ax) discloses utilization of trigger frames to schedule communication between clients and access points. Trigger frames schedule a group of clients associated with the access point or gateway device based on resource unit (also referred to ass sub carriers) that may be used for transmission.

However, conventionally, the trigger frames are often limited to a certain number of clients. For example, trigger frames may schedule a maximum of nine clients per trigger frame in a 20 MhZ channel. This often results in sending multiple trigger frames when a plurality of clients are present. This problem is particularly relevant in the industrial environments where a plurality of industrial devices are utilized. Accordingly, there is a need for a method and a device that addresses the issue mentioned above.

Accordingly, the current disclosure describes a method of communicating with a plurality of user equipment, by an access point. The method includes creating two or more client groups by grouping the plurality of user equipment based on a predefined number of resource units associated with the access point, transmitting a trigger frame to the two or more client groups, and receiving a response from a first user equipment from a first client group based on the trigger frame. Each client group from the two or more client groups includes one or more user equipment from the plurality of user equipment and a group identifier. The trigger frame includes client group information and a resource unit allocation information indicative of an allocation of resource units within the two or more client groups. The client group information includes one or more associations of one or more user equipment to a client group from the two or more client groups and a group transmission offset associated with the two or more client groups.

Accordingly, the current disclosure utilizes client groups to reduce the number of times the trigger frame is to be transmitted. By providing that user equipment are grouped into client groups, the trigger frame utilizes time division to enable various client groups to transmit over the resource units available to the access point, across different time periods or time slots. This allows for reduction of latency in industrial communications as multiple transmission of trigger frames is reduced, thereby reducing the transmission time and delay associated with the transmission of the trigger frames. In an embodiment, the trigger frame indicates a sequence of transmission amongst the two or more client groups.

In an embodiment, the method further includes determining the group transmission offset based on the two or more client groups. Accordingly, the group transmission offset may be determined dynamically based on the number of client groups and the number of resource units available at the access point. This allows for on-the-fly modification of the group transmission offset.

In an embodiment, trigger frames may be either broadcast or multicast to the two or more client groups. Accordingly, based on the broadcast or multicast transmission, the client groups receive the same trigger frame from the access point. In an embodiment, the resource unit allocation information is stored in an octet in the trigger frame. Accordingly, the resource allocation information may be stored in the existing format associated with trigger frame.

In an example, the response from the first user equipment from the first client group is transmitted within a first time period based on the group transmission offset, on a first resource unit from a plurality of resource units associated with the access point. Accordingly, the client group utilizes the resource units for transmission of responses to the access point. Accordingly, in another example, the method further includes receiving one or more responses from the other user equipment of the first client group, on other resource units from the plurality of resource units in the first time period. In an embodiment, the method further includes receiving one or more responses from one or more user equipment of a second client group from the two or more client groups on the plurality of resource units, at a second time period. The second time period is subsequent to the first time period.

In another aspect, the current disclosure describes a network device for communicating with a plurality of user equipment. The network device includes a network interface for communicating with the plurality of user equipment and one or more processors connected to a memory module. The one or more processors are configured to create two or more client groups by grouping the plurality of user equipment based on a predefined number of resource units associated with the access point. Each client group from the two or more client groups includes one or more user equipment from the plurality of user equipment and a group identifier. The one or more processors are further configured to transmit a trigger frame to the two or more client groups. The trigger frame includes client group information and a resource unit allocation information indicative of an allocation of resource units within the two or more client groups. The client group information includes one or more associations of one or more user equipment to a client group from the two or more client groups and a group transmission offset associated with the two or more client groups. The one or more processors are further configured to receive a response from a first user equipment from a first client group, based on the trigger frame. In another aspect, the current disclosure describes a non-transitory storage medium including a plurality of instructions that, when executed on one or more processors, causes the one or more processors to create two or more client groups by grouping a plurality of user equipment based on a predefined number of resource units associated with an access point. Each client group from the two or more client groups includes one or more user equipment from the plurality of user equipment and a group identifier. The plurality of instructions, when executed on the one or more processors, also causes the one or more processors to transmit a trigger frame to the two or more client groups. The trigger frame includes client group information and a resource unit allocation information indicative of an allocation of resource units within the two or more client groups. The client group information includes one or more associations of one or more user equipment to a client group from the two or more client groups and a group transmission offset associated with the two or more client groups. The plurality of instructions, when executed on the one or more processors, also causes the one or more processors to receive a response from a first user equipment from a first client group, based on the trigger frame. The advantages of the method apply to the device and the non-transitory storage medium.

BRIEF DESCRIPTION OF THE DRAWINGS

FIG. 3 illustrates examples of a resource unit allocation information table and a client group information table.

DETAILED DESCRIPTION

Figure 1:
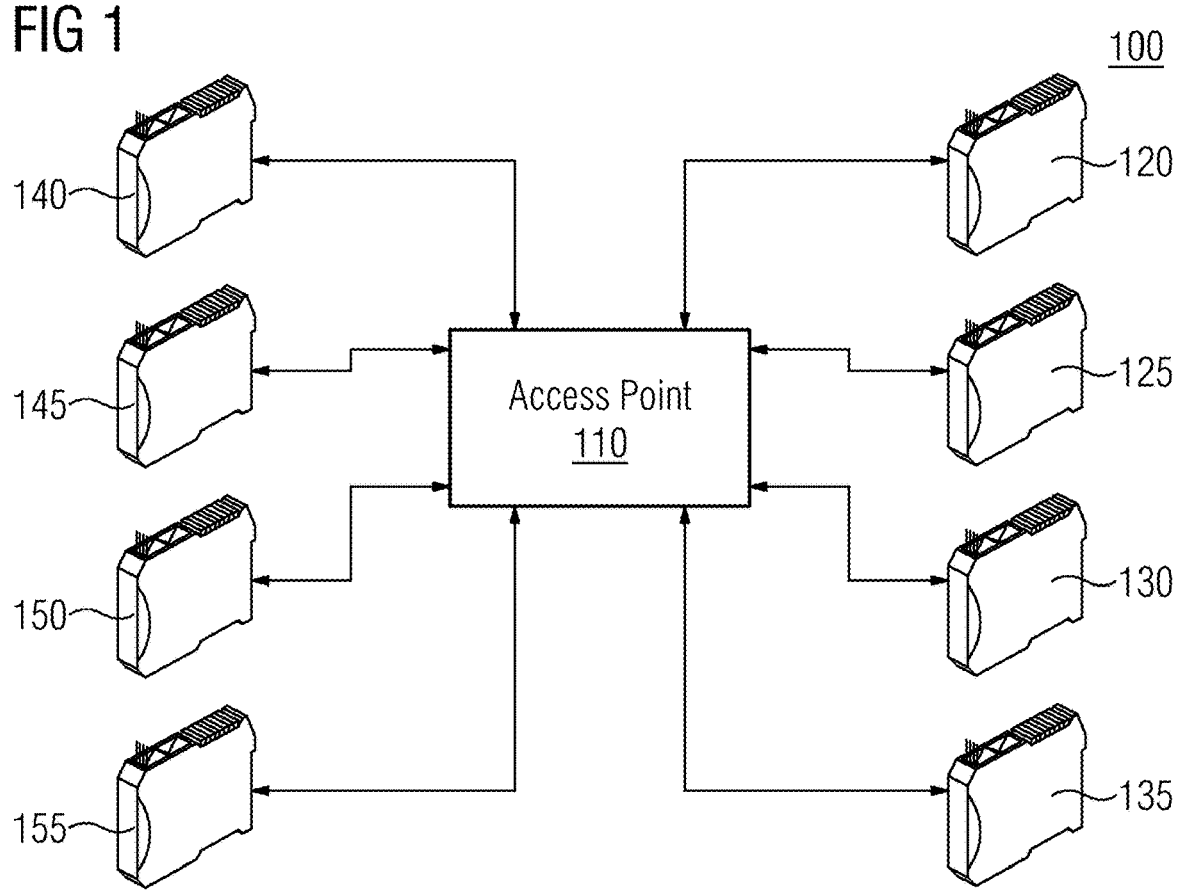
FIG. 1 illustrates an example of a section of an industrial facility including a plurality of user equipment connected to an access point device.

FIG. 1 illustrates a section 100 of an industrial facility including an access point device 110 connected to a plurality of user equipment. Industrial facility herein refers to any facility or environment where one or more industrial processes such as manufacturing, refining, smelting, and/or assembly of equipment may take place and includes process plants, oil refineries, automobile factories, electrical power plants, transportation infrastructure, such as railways, ships, etc. The industrial facility includes a plurality of control devices connected to a plurality of field devices for monitoring and regulating one or more processes in the industrial facility. These field devices may include flowmeters, value actuators, temperature sensors, pressure sensors, etc. The control devices may be connected to each other via a control network (e.g., realized via wired and wireless networks). Additionally, the industrial facility may include a plurality of mobile units including one or more robots for performing a plurality of operations such as welding, assembly of parts, one or more autonomous guidance vehicles for transportation and handling of material, one or more assets with RFID tags on conveyor belts, etc., in the industrial facility.

Communication in the industrial facility happens through an industrial network. The industrial network includes a plurality of wired and wireless networks. For example, the industrial network includes a first wireless sub-network. Additionally, the industrial network is connected to an enterprise network. The enterprise network includes asset management systems, manufacturing execution systems, etc.

The first wireless sub-network includes a plurality of network devices. The plurality of the network devices includes one or more access points (also referred to as gateway devices) and one or more user equipment (also referred to as user devices). Gateway device herein refers to network devices that are used for connecting other network devices to the network and includes base stations, routers, switches, etc. The gateway devices are affixed to a plurality of locations in the industrial facility. The user devices in the industrial facility are connected to the gateway devices for connecting to the corresponding wireless network and for communicating information with the other devices and systems in the industrial facility. For example, the first wireless network is a Wi-Fi 6 based wireless network, including gateway devices or access point 110 and user equipment (e.g., elements 120, 125, 130, 135, 140, 145, 150, and 155). The access point utilizes trigger frames to communicate with multiple groups of user equipment using time slots to provide that a single trigger frame is sufficient to communicate a plurality of user equipment. This is further explained in the description associated with FIG. 2.

Figure 2:
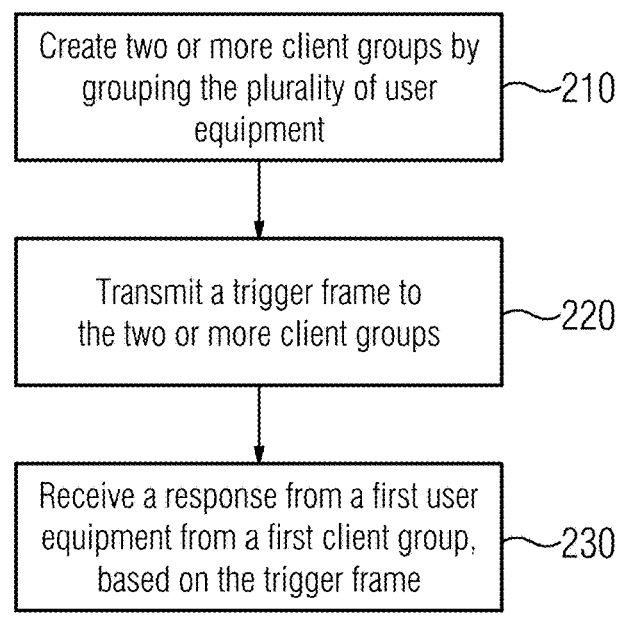
FIG. 2 illustrates one embodiment of a method of communicating with a plurality of user equipment using an access point.

FIG. 2 illustrates one embodiment of a method 200 of communicating with a plurality of user equipment (120, 125, 130, 135, 140, 145, 150 and 155), by the access point device 110. While the method 200 is explained using access point 110, the method 200 may be realized by other gateway devices as well.

At act 210, the access point 110 creates two or more client groups by grouping the plurality of user equipment (e.g., elements 120, 125, 130, 135, 140, 145, 150 and 155) based on a predefined number of resource units associated with the access point. Each client group from the two or more client groups includes one or more user equipment from the plurality of user equipment and a group identifier. Resource unit refers to a group of bandwidth subcarriers in orthogonal frequency divisional multiple access (OFDMA). The access point 210 may have a predefined number of resource units (e.g., eight resource units) over which communication may be carried out. Based on the resource units, the access point 110 groups the user equipment into client groups. For example, since the access point 110 has eight resource units, the access point 110 dedicates two resource units for a user equipment. Accordingly, the access point 110 creates two client groups, and each client group includes four user equipment. For example, the first client group includes user equipment 120, 125, 130 and 135. Similarly, the second client group includes user equipment 140, 145, 150 and 155. In an example, the access point 110 determines the number of user equipment around its radio proximity based on one or more techniques well known in the state of the art.

Then, at act 220, the access point transmits a trigger frame to the two or more client groups. In an example, the trigger frame is broadcast to the two or more client groups. In another example, the trigger frame is multicast to the two or more client groups. The trigger frame includes client group information and resource unit allocation information. Client group information includes one or more associations of one or more user equipment to a client group from the two or more client groups and a group transmission offset associated with the two or more client groups. Association of the user equipment to the client group indicates to the client group to which the user equipment belongs. For example, the client group information includes the device identifier of each user equipment assigned against a group identifier of a client group. This is further explained using table 320, as shown in FIG. 3.

Table 320 illustrates a part of the client group information associated with a 'group 1'. The group 1 includes four user equipment. Each user equipment is identified using a device identifier (e.g., the medium access control address of the device). Additionally, against each device identifier, the group identifier of the 'group 1' is specified (shown as 101 in the FIG. 3). Additionally, each user equipment is assigned a specific position in an order in the group. For example, as shown in the FIG. 3, the user equipment having medium access control (MAC) address '00:00:5e:00:53:ab' is assigned to be device 1 in the group 1.

Similarly, user equipment having medium access control address '00:10:2A:00:51:ac' is assigned to be device 2 in the group 1. Additionally, user equipment having medium access control (MAC) address '00:14:3D:00:34:ae' is assigned to be device 3 in the group 1. Finally, user equipment having medium access control (MAC) address '00:13:3F:00:34:af' is assigned to be device 4 in the group 1. In an example, the resource unit allocation information is stored in an octet in the trigger frame.

By creating groups, the access point provides that each client group communicates in a time slot or time period associated with the corresponding client group using the resource units allocated to user equipment in the client group. Accordingly, in an example, where the access point 110 creates two client groups, the first client group communicates with the access point in the first time slot and the second client group communicates with the access point in the second time slot. The duration or length of the time slot is specified by the group transmission offset. For example, when the group transmission offset is set to 40 milliseconds, each time slot is of 40 milliseconds.

Additionally, as mentioned above, the trigger frame includes resource unit allocation information. Resource unit allocation information is indicative of an allocation of resource units within the two or more client groups. This is explained further using table 310 of FIG. 3. For example, as shown in Table 310, the resource unit 1 is allocated to device 1 in the order of the groups. Accordingly, user equipment that is assigned device 1 position in groups may use the resource unit 1 for communication with the access point in the corresponding time slot or time period associated with the client group.

At act 230, the access point 110 receives a response from a first user equipment from a first client group, based on the trigger frame. As mentioned above, the trigger frame informs the user equipment about the client group information and the resource unit allocation information. Based on the client group information, the first user equipment determines the group to which it belongs, and accordingly, a time slot in which the first user equipment may communicate with the access point. Additionally, based on the resource unit allocation information, the first user equipment determines the resource unit that may be used to communicate with the access point 110. For example, the first user equipment is assigned device 1 position in the first client group. Then, based on the resource unit allocation, the first user equipment determines that the resource unit 1 is the resource unit to be utilized. In addition to the first user equipment, the other user equipment of the first client group also transmits responses to the access point 110 in the time slot or time period associated with the first client group using the resource units of the access point 110.

Additionally, in an embodiment, the trigger frame indicates a sequence of transmission amongst the two or more client groups. Accordingly, the client group information indicates the sequence in which the client groups are to transmit to the access points. Accordingly, after the first client group completes its transmission at the end of the time slot or time period associated with the first client group, the second client group begins to transmit after the first client group, at a second time period or time slot subsequent to the first time period or time slot.

Accordingly, the current disclosure utilizes client groups to reduce the number of times the trigger frame is to be transmitted. By providing that user equipment is grouped into client groups, the trigger frame utilizes time division to enable various client groups to transmit over the resource units available to the access point, across different time periods or time slots. This allows for reduction of latency in industrial communications, as multiple transmission of trigger frames is reduced, thereby reducing the transmission time and delay associated with the transmission of the trigger frames.

In an embodiment, the method further includes determining the group transmission offset based on the two or more client groups. Based on the number of client groups, the access point determines the duration for the transmission for the client group (e.g., the group transmission offset). For example, based on the number of user equipment per client group, the access point determines the group transmission offset. For example, if the access point determines the group transmission offset based on historic data associated with the user equipment. For example, based on the communication associated with the user equipment in the past, the group transmission offset may be set by the access point.

Figure 4:
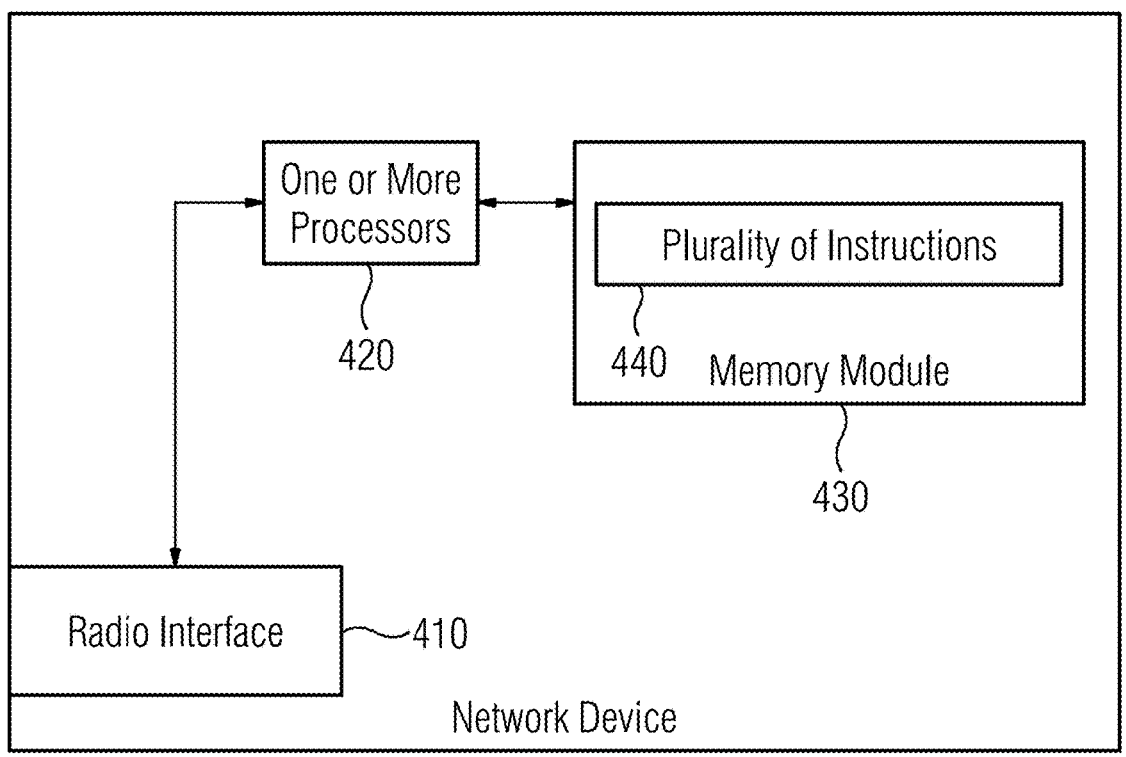
FIG. 4 illustrates one embodiment of a network device for communicating with a plurality of user equipment.

While the above mentioned is explained with reference to the access point 110, the above method may be realized using one or more devices or via one or more software modules. Accordingly, the current disclosure describes a network device 400 that is further described in relation to FIG. 4.

Accordingly, the current disclosure describes a network device 400 for communicating with a plurality of user equipment. The network device 400 includes a radio interface 410 for communicating with the plurality of user equipment, and one or more processors 420 connected to a memory module 430. The memory module 430 (also referred to as non-transitory storage medium 430) includes a plurality of instructions 440 that, when executed on the one or more processors 420, cause the one or more processors 420 to create two or more client groups by grouping the plurality of user equipment based on a predefined number of resource units associated with the access point. Each client group from the two or more client groups includes one or more user equipment from the plurality of user equipment and a group identifier. The plurality of instructions 440, when executed on the one or more processors 420, also cause the one or more processors 420 to transmit a trigger frame to the two or more client groups. The trigger frame includes client group information and a resource unit allocation information indicative of an allocation of resource units within the two or more client groups. The client group information includes one or more associations of one or more user equipment to a client group from the two or more client groups and a group transmission offset associated with the two or more client groups, and receive a response from a first user equipment from a first client group, based on the trigger frame.

For the purpose of this description, a computer-usable or computer-readable non-transitory storage medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device), or propagation mediums in and of themselves as signal carriers are not included in the definition of physical computer-readable medium. Physical computer-readable medium includes a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments.

In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of communicating with a plurality of user equipment by an access point, the method comprising:
    creating two or more client groups, the creating of the two or more client groups comprising grouping the plurality of user equipment based on a predefined number of resource units associated with the access point, each client group from the two or more client groups comprising one or more user equipment from the plurality of user equipment and a group identifier;
    transmitting a trigger frame to the two or more client groups, the trigger frame comprising client group information and a resource unit allocation information indicative of an allocation of resource units within the two or more client groups, wherein the client group information comprises one or more associations of one or more user equipment of the plurality of user equipment to a client group from the two or more client groups and a group transmission offset associated with the two or more client groups; and
    receiving a response from a first user equipment of the plurality of user equipment from a first client group of the two or more client groups, based on the trigger frame.

2. The method of claim 1, wherein the trigger frame indicates a sequence of transmission amongst the two or more client groups.

3. The method of claim 1, further comprising determining the group transmission offset based on the two or more client groups.

4. The method of claim 1, wherein the trigger frame is broadcast or multicast to the two or more client groups.

5. The method of claim 1, wherein the resource unit allocation information is stored in an octet in the trigger frame.

6. The method of claim 1, wherein the response from the first user equipment from the first client group is transmitted within a first time period based on the group transmission offset, on a first resource unit from a plurality of resource units associated with the access point.

7. The method of claim 6, further comprising receiving one or more responses from other user equipment of the first client group, on other resource units from the plurality of resource units in the first time period.

8. The method of claim 7, further comprising receiving one or more responses from one or more user equipment of a second client group from the two or more client groups on the plurality of resource units, at a second time period, wherein the second time period is subsequent to the first time period.

9. A network device for communicating with a plurality of user equipment, the network device comprising:
    a network interface configured to communicate with the plurality of user equipment; and
    one or more processors connected to a memory module, the one or more processors configured to:
        create two or more client groups, the creation of the two or more client groups comprising grouping the plurality of user equipment based on a predefined number of resource units associated with the network device, each client group from the two or more client groups comprising one or more user equipment from the plurality of user equipment and a group identifier;
        transmit a trigger frame to the two or more client groups, the trigger frame comprising client group information and a resource unit allocation information indicative of an allocation of resource units within the two or more client groups, wherein the client group information comprises one or more associations of one or more user equipment of the plurality of user equipment to a client group from the two or more client groups and a group transmission offset associated with the two or more client groups; and
        receive a response from a first user equipment from a first client group, based on the trigger frame.

10. A non-transitory computer-readable storage medium that stores instructions executable by one or more processors to communicate with a plurality of user equipment by an access point, the instructions comprising:
    creating two or more client groups, the creating of the two or more client groups comprising grouping a plurality of user equipment based on a predefined number of resource units associated with an access point, each client group from the two or more client groups comprising one or more user equipment from the plurality of user equipment and a group identifier;
    transmitting a trigger frame to the two or more client groups, the trigger frame comprising client group information and a resource unit allocation information indicative of an allocation of resource units within the two or more client groups, wherein the client group information comprises one or more associations of one or more user equipment of the plurality of user equipment to a client group from the two or more client groups and a group transmission offset associated with the two or more client groups; and receiving a response from a first user equipment from a first client group, based on the trigger frame.

* * * * *